US011200267B2

(12) United States Patent
Kadatoka et al.

(10) Patent No.: US 11,200,267 B2
(45) Date of Patent: Dec. 14, 2021

(54) MAIL ROOM INTENT ANALYZER

(71) Applicant: AMERICAN EXPRESS TRAVEL RELATED SERVICES COMPANY, INC., New York, NY (US)

(72) Inventors: Chetana Kadatoka, Phoenix, AZ (US); Edward K. Samson, Chandler, AZ (US); Vivek Tripathi, Phoenix, AZ (US)

(73) Assignee: American Express Travel Related Services Company, New York, NY (US)

( * ) Notice: Subject to any disclaimer, the term of this patent is extended or adjusted under 35 U.S.C. 154(b) by 338 days.

(21) Appl. No.: 16/453,751

(22) Filed: Jun. 26, 2019

(65) Prior Publication Data

US 2020/0409981 A1 Dec. 31, 2020

(51) Int. Cl.
*G06F 16/33* (2019.01)
*G06F 21/60* (2013.01)
*H04L 12/58* (2006.01)
*G06F 16/35* (2019.01)
*G06F 40/284* (2020.01)

(52) U.S. Cl.
CPC ........ *G06F 16/3347* (2019.01); *G06F 16/353* (2019.01); *G06F 21/602* (2013.01); *G06F 40/284* (2020.01); *H04L 51/00* (2013.01)

(58) Field of Classification Search
CPC ... G06F 16/3347; G06F 16/353; G06F 40/284
See application file for complete search history.

(56) References Cited

U.S. PATENT DOCUMENTS

2013/0066866 A1* 3/2013 Chan ............... G06F 16/335
707/732
2018/0173698 A1* 6/2018 Dubey ................. G06F 40/30

\* cited by examiner

*Primary Examiner* — Loc Tran
(74) *Attorney, Agent, or Firm* — Thomas | Horstemeyer, LLP

(57) ABSTRACT

A system for automated classifying of electronic messages is disclosed. The system may receive an electronic message comprising a text including a message body and a metadata. The system may determine a case status based on the metadata and extract a set of events form the message body in response to the case status. The system may determine a case type based on the set of events and a set of case types. The system may generate a new case event in a case management system based on the case type.

20 Claims, 10 Drawing Sheets

MAIL ROOM INTENT ANALYZER

FIELD

The present disclosure generally relates to systems and methods for classifying electronic messages.

BACKGROUND

Traditional methods of electronic mail management typically rely on a single shared mail box to aggregate electronic messages such as support requests. A technical problem exists in that throughput is limited by the efficiency and number of sorting operators that read the communications and determine the intent for assignment to the appropriate support function. Furthermore, errors may be introduced in sorting given the mostly manual nature of sorting and assignment of support requests to appropriate operators. In this regard, electronic message sorting and analysis by traditional manual methods is usually time consuming, demands a relatively large number of user inputs, and may be intolerant of informational faults.

SUMMARY

In various embodiments, systems, methods, and articles of manufacture (collectively, the "system") for automated classifying of electronic messages are disclosed. The system may receive an electronic message comprising a text including a message body and a metadata. The system may determine a case status based on the metadata and extract a set of events form the message body in response to the case status. The system may determine a case type based on the set of events and a set of case types. The system may generate a new case event in a case management system based on the case type.

In various embodiments, the system may pull the electronic message from a shared mailbox of an electronic mail system. The system may validate the metadata and the message body for readability and determine an encrypted portion of the text. The system may call a decryption service to generate a plain text of the text from the encrypted portion. The system may pass the plain text to a stripping module.

In various embodiments, the system may also strip the metadata and the message body from the plain text. The system may extract from the metadata at least one of a sender, a receiver, a copied to, or a subject. The system may extract from the message body at least one of a greeting, a body meat, a signature, a disclaimer, and an attachment from the message body. In various embodiments, the extraction is based on an extraction pattern matching algorithm configured to identify sentence fragments of the text based on content and relative position within the text. In various embodiments, the system may tokenize the body meat into a plurality of tokenized sentences via a tokenizer subprocess. The system may apply a perceptron tagging algorithm to generate a tagged sentence set based on a custom defined electronic message corpus and a standard language corpus. The system may determine a set of valid events based on the tagged sentence set and an applied set of grammar rules defining the set of events.

In various embodiments, the system may apply an abbreviated term expander to the tagged sentence set, removing an abbreviated text, and injecting an expanded text into the tagged sentence set. The system may generate a raw event set based on the tagged sentence set and the applied set of grammar rules. The system may compare the raw event set with a set of noise events. The system may discard an event from the raw events set which positively compares with the noise event sent to generate the set of valid events. The system may extract a reference ID from the body meat. The system may extract a named entity from the body meat.

In various embodiments, the system may generate a possible case type set based on the metadata wherein the possible case type set comprises a case type associated with a helper tag. The system may apply a glove algorithm to each of the possible case type set, the named entity, the set of valid events, and the helper tag to generate an entities word vector, an events word vector, a case types word vector, and a helper tags word vector. The system may match the entities word vector, the events word vector, the case types word vector, and the helper tags word vector to generate a match set. The system may rank the match set to generate a ranked match set.

In various embodiments, the system may calculate a classification score for a highest ranked element of the ranked match set. The system may generate the new case event in the case management system having a default case type when the classification score is less than a classification score cutoff. The system may generate the new case event in the case management system having a case type associated with the highest ranked element of the ranked match set when the classification score is greater than the classification score cutoff.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may be obtained by referring to the detailed description and claims when considered in connection with the drawing figures, wherein like numerals denote like elements.

DETAILED DESCRIPTION

The system provides a greater level of sophistication and control for electronic messaging systems. Benefits of the present disclosure may apply to any suitable use of electronic messages. For example, the present disclosure may apply in sales contexts, information requests or support contexts.

While prior art systems typically include the technical problem of demanding multiple user inputs when determining an intent, sorting messages, and generating a case, the current system provides a technical solution by determining the intent on the basis of message metadata and body content comprising a user intent. In this regard, the system may increase the speed and efficiency of message processing by enabling automated case creation. The system may reduce the process time a case creation process is engaged by a user. The system may also reduce redundant support requests, thereby reducing the demand for system resources. The system may simplify message sorting, routing, and case creation processing and enhance user experience by decreasing the number of user interactions.

This process improves the functioning of the computer. For example, the process increases the reliability and speed of information support request processing by reducing a number of user inputs and/or bypassing a number of user input requests to assign messages and generate cases. Similarly, the process increases the reliability and speed of data presentation by enabling automated message routing and case generation. In various embodiments, the processes described herein may increase network availability by reducing front end and back end process calls and/or network hops. The processes may also save processing resources including CPU time, memory resources, and network resources. In various embodiments, the process may be scalable across a cloud infrastructure tending thereby to enable on demand message sorting across electronic mail boxes.

Figure 1:
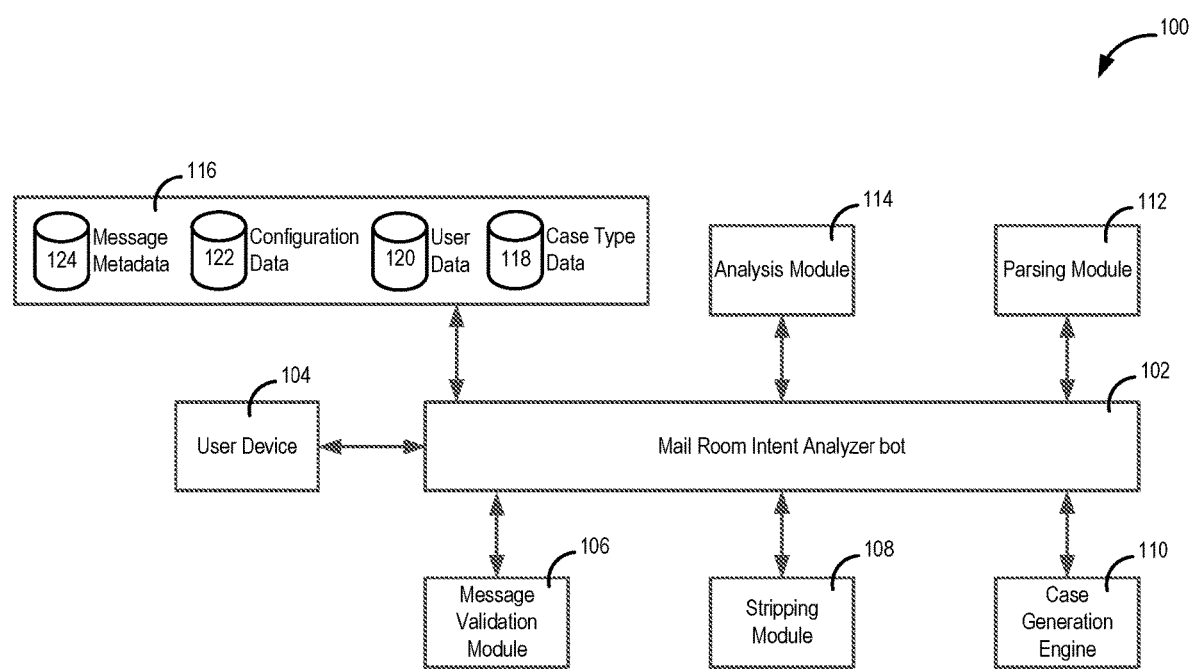
FIG. 1 is a block diagram illustrating various system components of a system for classifying electronic messages, in accordance with various embodiments.

In various embodiments, and with reference to FIG. 1, a system 100 for classifying electronic messages may comprise a mail room intent analyzer 102, a user device 104, a message validation module (MVM) 106, a content stripping module (stripping module) 108, a case generation engine 110, a parsing module 112, an analysis module 114, and a database 116. Any of these components may be outsourced and/or be in communication with mail room intent analyzer 102 via a network. System 100 may be computer based, and may comprise a processor, a tangible non-transitory computer-readable memory, and/or a network interface, along with other suitable system software and hardware components. Instructions stored on the tangible non-transitory memory may allow system 100 to perform various functions, as described herein. In various embodiments, mail room intent analyzer 102 may be configured as a central network element or hub to access various systems, engines, and components of system 100. Mail room intent analyzer 102 may comprise a network, computer-based system, and/ or software components configured to provide an access point to various systems, engines, and components. Mail room intent analyzer 102 may be in operative and/or electronic communication with the user device 104, the MVM 106, the stripping module 108, the case generation engine 110, the parsing module 112, the analysis module 114, and the database 116. In this regard, the mail room intent analyzer 102 may allow communication from user device 104 and database 116 to systems, engines, and components of system 100.

In various embodiments, user device 104 may comprise software and/or hardware in communication with mail room intent analyzer 102 via a network comprising hardware and/or software configured to allow a transaction account owner, a user, and/or the like, access to mail room intent analyzer 102. User device 104 may comprise any suitable device that is configured to allow a user to communicate with a network and mail room intent analyzer 102. User device 104 may include, for example, a personal computer, personal digital assistant, cellular phone, kiosk, and/or the like, and may allow a user to transmit voice communications and/or electronic messages such as, for example, electronic mail.

In various embodiments, database 116 may include any number of data structures or data elements such as, for example, case type data 118, user data 120, configuration data 122, and/or message metadata 124. Database 116 may be configured to maintain case type data 118 such as, for example, an array of case types each associated with a set of user configurable intent elements. Database 116 may be configured to maintain user data 120 such as, for example, data relating to a user, a set of case records associated with the user, user permissions, user identity data, and/or the like. Database 116 may be configured to maintain configuration data 122 such as, for example, classification configurations, mailbox configurations, mailbox scheduler data, and/or the like. Database 116 may be configured to maintain message metadata 124 relating to electronic messages, for example, sender data, receiver list, copied to list, subject text, and/or the like.

Figure 2:
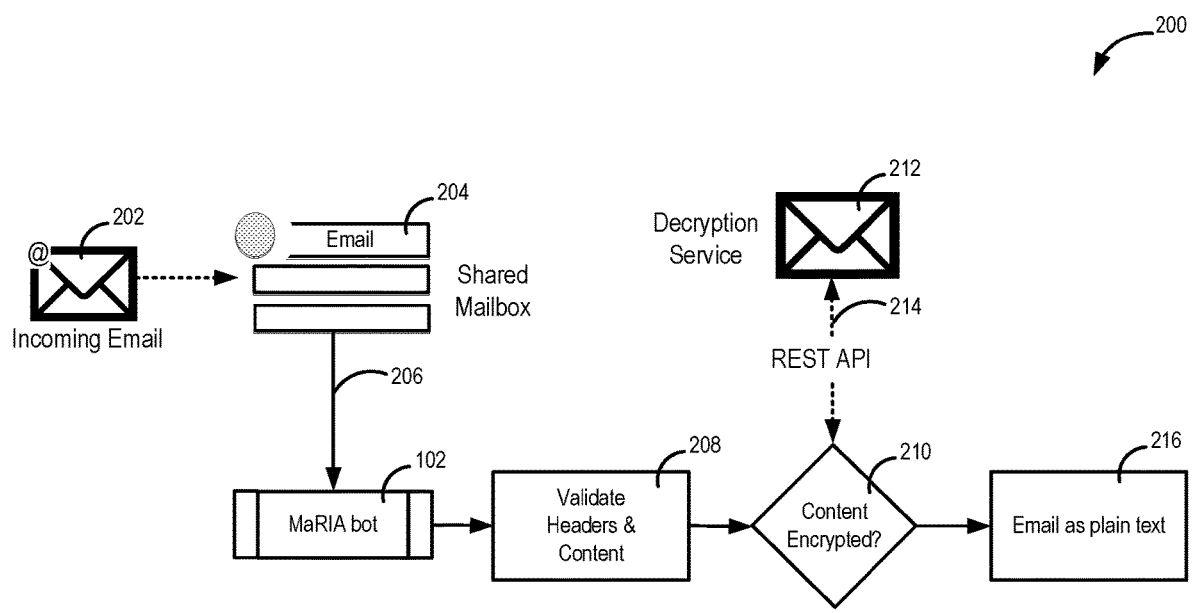
FIG. 2 illustrates a process for validating electronic messages in a system for classifying electronic messages, in accordance with various embodiments.

With reference to FIG. 2, a process 200 (e.g., in system 100) for validating electronic messages is illustrated. User device 104 may generate an electronic message comprising text including metadata and a message body (step 202). The user device 104 may transmit the electronic message to a shared mailbox of an electronic mail system of system 100 (step 204). The mail room intent analyzer 102 may pull the electronic message generated at 202 from the shared mailbox by, for example, an IMAP pull request (step 206). As will be appreciated by those skilled in the art, the system may pull the electronic messages in response to receipt, in batches, and/or other useful rules which may be configured. The system 100 may validate the text (step 208), including the message body and the metadata (e.g., a message header) for readability (e.g., corrupted contents, gibberish text, and/or the like) and determine the presence or absence of an encrypted portion of the text. The system may determine the text comprises an encrypted portion (step 210) and, in response, call a decryption service 212 via an API function 214. For example, the message header my indicate an encrypted portion or the system may scan the message body for an encrypted portion. The decryption service 212 may generate a plain text of the text from the encrypted portion (e.g., via a decryption key) and return the plain text via the API function 214. In various embodiments, the system 100 may pass the plain text to the stripping module 108 (step 216).

Figure 3:
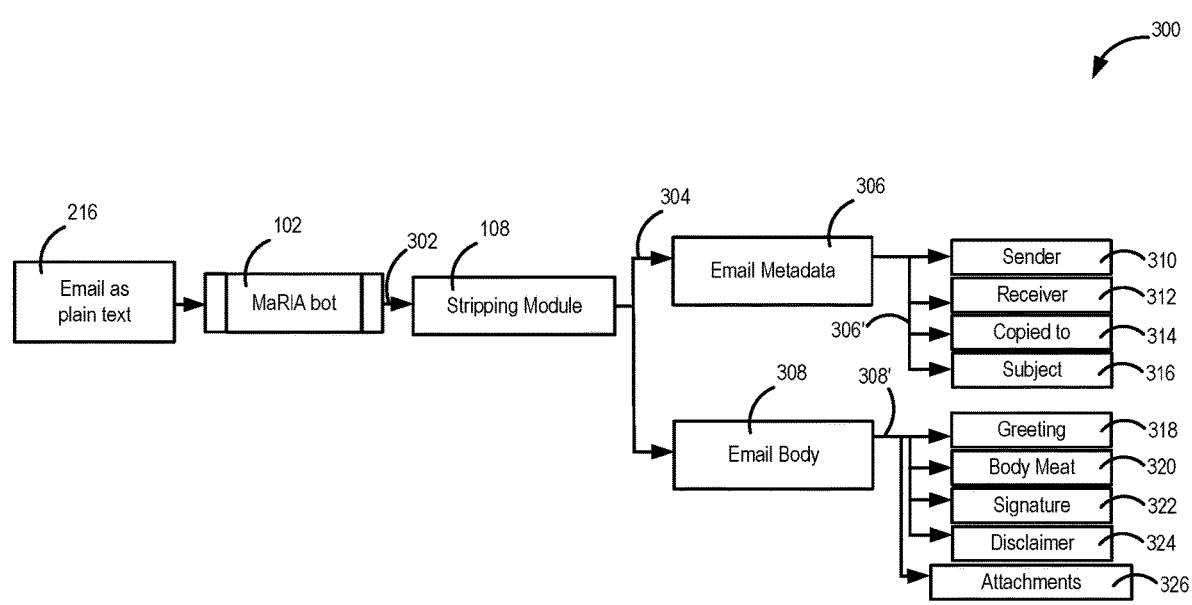
FIG. 3 illustrates a process for information stripping in a system for classifying electronic messages, in accordance with various embodiments.

With additional reference to FIG. 3, a process 300 (e.g., in system 100) for information stripping is illustrated. The stripping module 108 may receive the plain text from the mail room intent analyzer 102 (step 302), and may extract a message metadata and a message body from the plain text (step 304). In various embodiments, the stripping module 108 may comprise a metadata parser 306 and a body parser 308. The stripping module may comprise an 1×ml parser configured to separate the metadata and the message body. The metadata parser 306 may be configured to extract elements of a structured message header such as a sender 310, a receiver 312, a copy to (CC) field 314, and a subject field 316. The metadata parser 306 may extract the metadata elements in response to receiving the metadata (step 306') and, in like regard, the body parser 308 may extract body elements in response to receiving the message body (step 308'). Each of the sender 310, receiver 312, and CC field 314 may comprise one or more unique email addresses of an email system. In various embodiments, the subject field 316 may comprise text data including a case management system record ID. The body parser 308 may comprise an extraction pattern matching algorithm configured to identify sentence fragments of the text based on content and relative position within the text. For example, a body text may read:

Hello Jane,
I would like to update my bank account number from 123 to 456.
Thanks,
Tom.
DISCLAIMER—emails may contain viruses, only open emails from a trusted source.

The body parser 308 may pattern match for content having salutations such as, for example, 'hello', 'hi', 'dear', and/or the like and extract "Hello Jane" as a greeting 318. The body parser 308 may match for content having a closing and signature such as, for example, 'thanks', 'sincerely', 'regards', 'best', 'respectfully', and/or the like and extract "Thanks, Tom" as a signature 322. The body parser 308 may extract any text between the greeting 318 and the signature 322, for example, "I would like to update my bank account number from 123 to 456" as the body meat 320. In like regard, the body parser 308 may match for content having disclaimer language or may extract text after the signature 322, for example, "DISCLAIMER—emails may contain viruses, only open emails from a trusted source" as a disclaimer 324. In various embodiments, the electronic message may comprise file attachments and the body parser 308 may be configured to extract the attachments 326.

In various embodiments, the system 100 may store the extracted metadata elements (310, 312, 314, 316) and message body elements (318, 320, 322, 324, 326) in database 116. For example, the metadata elements may be stored as message metadata 124. Each of the email addresses of metadata elements (310, 312, 314) may be associated in database 116 with user data 120 records, configuration data 122 records, and/or case type data 118 records. In various embodiments, attachments 326 may be extracted in native format and associated with a reference ID assigned to the electronic message. In various embodiments, any of the message body elements or the metadata elements may be associated with the reference ID.

Figure 4:
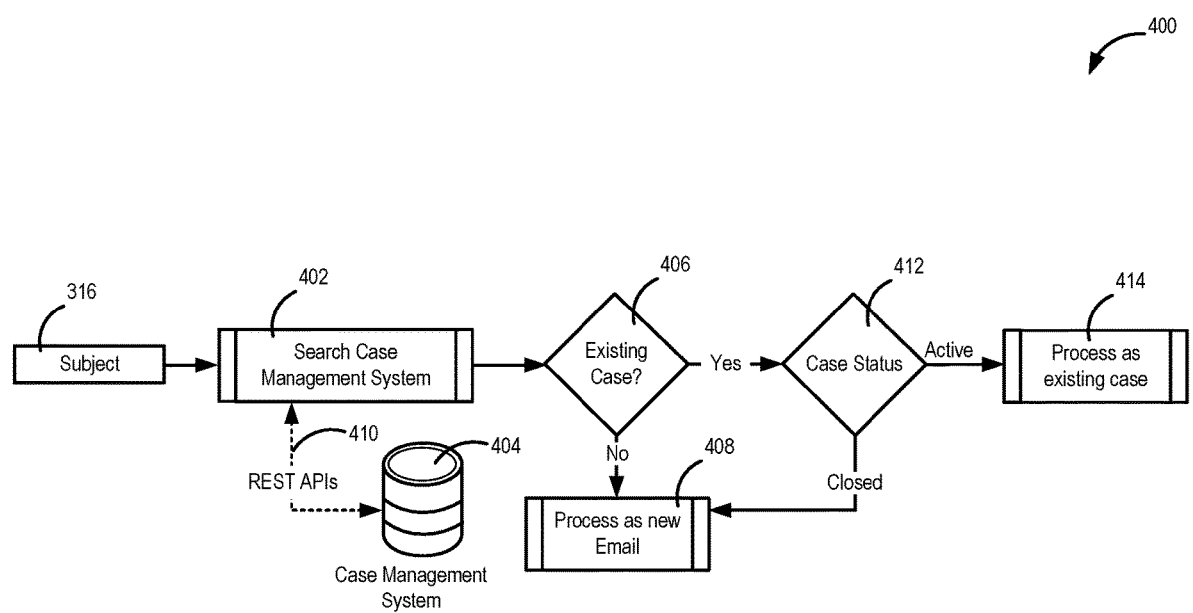
FIG. 4 illustrates a flow control process for information stripping in a system for classifying electronic messages, in accordance with various embodiments.

With additional reference to FIG. 4, a flow control process 400 for information stripping in system 100 for classifying electronic messages is illustrated. The system may search a case management system 404 to determine a case status based on the metadata (step 402) such as, for example, the subject 316. The subject 316 may contain a case management system record ID and the system may check for existing cases matching the case management system record ID (step 406). Where the subject 316 does not contain a case management system record ID, the system may pass the extracted metadata elements and body data elements to the parsing module 112 and/or analysis module 114 for further processing (step 408). Step 408 includes case generation engine 110 generating a new case management system record ID and associating the electronic message with the new case management system record ID. Where the subject 316 contains a case management system record ID, the system may pull a case record ID table via an API function 410. The system may determine the case status based on the case management system record ID and associated Boolean attributes of the case record ID table (step 412) (e.g., 'open' or 'closed' attribute for each case management system record ID). In response to determining an active case status, the system may associate the electronic message and the extracted attachments 326 with the case management system record ID and execute a closeout process (step 414). In response to determining a closed case status, the system may execute step 408 and may associate the new case management system record ID with the closed case management system record ID.

Figure 5:
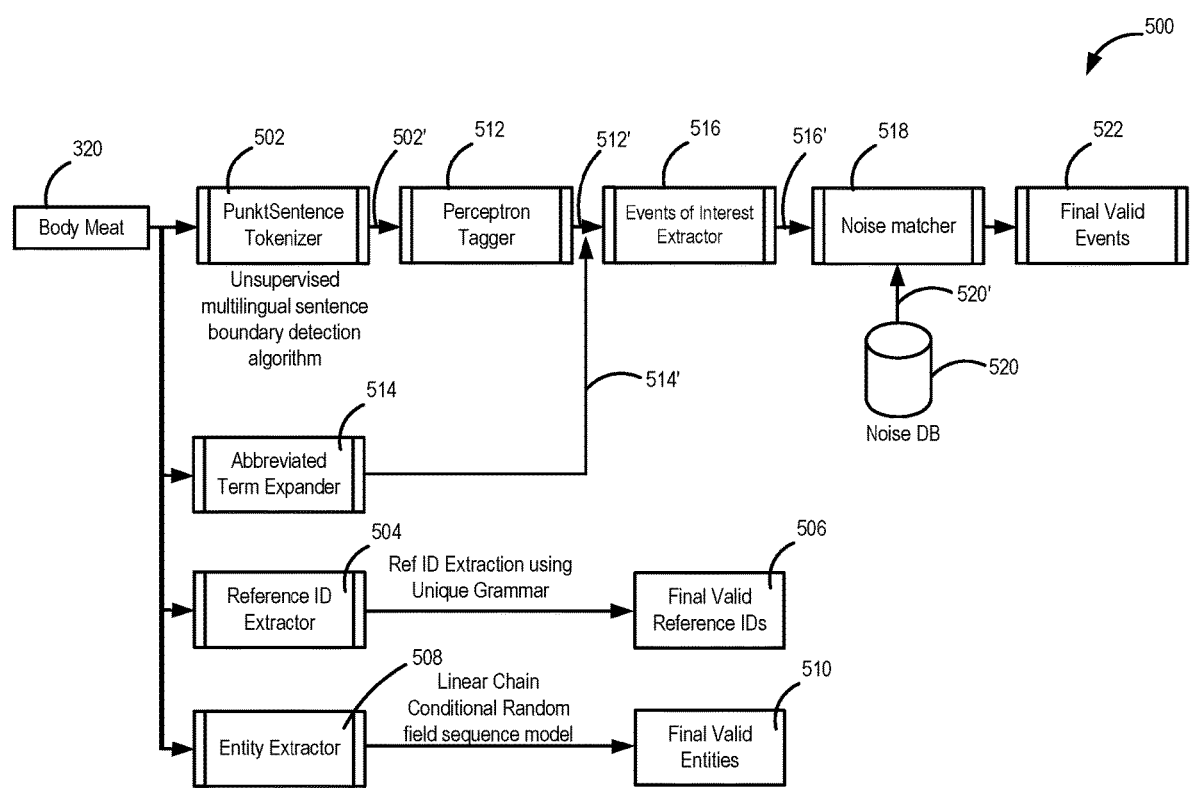
FIG. 5 illustrates an information parsing process in a system for classifying electronic messages, in accordance with various embodiments.

With additional reference to FIG. 5, an information parsing process 500 in system 100 for classifying electronic messages is illustrated. In various embodiments, the parsing module 112 may receive the body meat 320 from the stripping module 108 according to the operations of steps 406 and 412, and in response, generate an event set. In this regard, the system may extract a set of events from the message body based on the case status (i.e., where no case management system record ID is found or where the case status is determined closed). The system may tokenize the body meat into a plurality of tokenized sentences 502' via a tokenizer subprocess (step 502). For example, the parsing module 112 may apply an unsupervised learning algorithm, which may include boundary detection, to extract individual (i.e. tokenized) sentences for further processing. The tokenizer may be trained on a large corpus of plain text, and may define sentence boundaries based on, for example, known words that start sentences, capitalization, and punctuation marks such as periods.

Process 500 may include applying a perceptron part-of-speech tagging algorithm to the tokenized sentences to generate a tagged sentence set 512' (step 512). The tagging algorithm may generate the tagged sentence set 512' based on a custom defined electronic message corpus (e.g., all electronic messages received at the shared mailbox) and a standard language corpus such as, for example, the Brown University Standard Corpus of Present-Day American English. The tagged sentence set 512' comprises tokenized sentences wherein each word is tagged and associated with a part-of-speech attribute. In various embodiments, the custom defined electronic message corpus may be stored in database 116 as configuration data 122. In various embodiments, the system applies an abbreviated term expander subprocess to the body meat 320 (step 514). Step 514 includes searching the body meat 320 for abbreviated text and replacing the abbreviated text with an expanded text 514'. For example, an abbreviated text may be "IRS" and the abbreviated term expander may replace "IRS" with "Internal Revenue Service". Step 514 may include removing an abbreviated text from the tagged sentence set and injecting the expanded text 514' into the tagged sentence set 512'. In various embodiments, a custom defined library of abbreviated text and associated expanded text may be stored in database 116 as configuration data 122.

Process 500 includes running an event of interest extraction subprocess to extract an event set from the tagged sentence set 512' (step 516). The event of interest extraction subprocess may apply a set of grammar rules defining a set of events. The set of grammar rules may be applied to the part-of-speech attribute of each word in a tagged sentence to determine the event. In this regard, applying the set of grammar rules to each of the tagged sentences in the tagged sentence set generates a raw event set 516'. In various embodiments, the set of grammar rules may be stored in database 116 as configuration data 122. In various embodiments, the system may pass the raw event set 516' through a noise filtering algorithm (step 518). The noise filtering algorithm may compare the raw event set 516' with a set of noise events 520' pulled from a noise database 520. The noise database 520 may be included as configuration data 122 in database 116. The noise database 520 may include the set of noise events 520' which may be defined by noise grammar rules such as, for example, a sequence of part-of speech attributes in a tagged sentence, a set of tokenized sentences, and or the like. The system may discard from the raw event set 516' events that positively compare with the noise event set to generate a set of valid events 522. In this regard, the system may extract certain sets of events from the message body.

The system may extract a set of reference IDs 506 from the body meat 320 via a reference ID extractor subprocess (step 504). Step 504 includes searching the body meat 320 for reference IDs such as, for example, a card number, an account number, a phone number, a user email, a cardmember email, a case management system record ID, and/or the like to generate the set of reference IDs. In various embodiments, reference IDs may be matched based on a unique format. For example, the card number may comprise a series of numerals such as, for example: four digits followed by a dash, six digits followed by a dash and then five digits. A search algorithm may extract the reference IDs based on configurable patterns which may be matched as the reference IDs in the body meat 320. The system may extract a set of named entities 510 from the body meat 320 via an entity extractor subprocess (step 508). Step 508 includes searching the body meat 320 for entities such as, for example, a merchant ID, a merchant name, an user name, a place name, and/or the like. For example, the body meat 320 may contain the statement, "I went to the ACME, CO. store off Main St. in Anytown, USA" and the extractor subprocess may assign "ACME, Co.," "Main St.," and "Anytown, USA" as named entities 510. The entity extractor subprocess may include a linear chain conditional random field sequence model to extract the named entities 510. In various embodiments, the system may include a Named Entity Recognizer (NER), such as the Stanford NER as described at nlp.Stanford.edu/software/CRF-NER. html.

Figure 6:
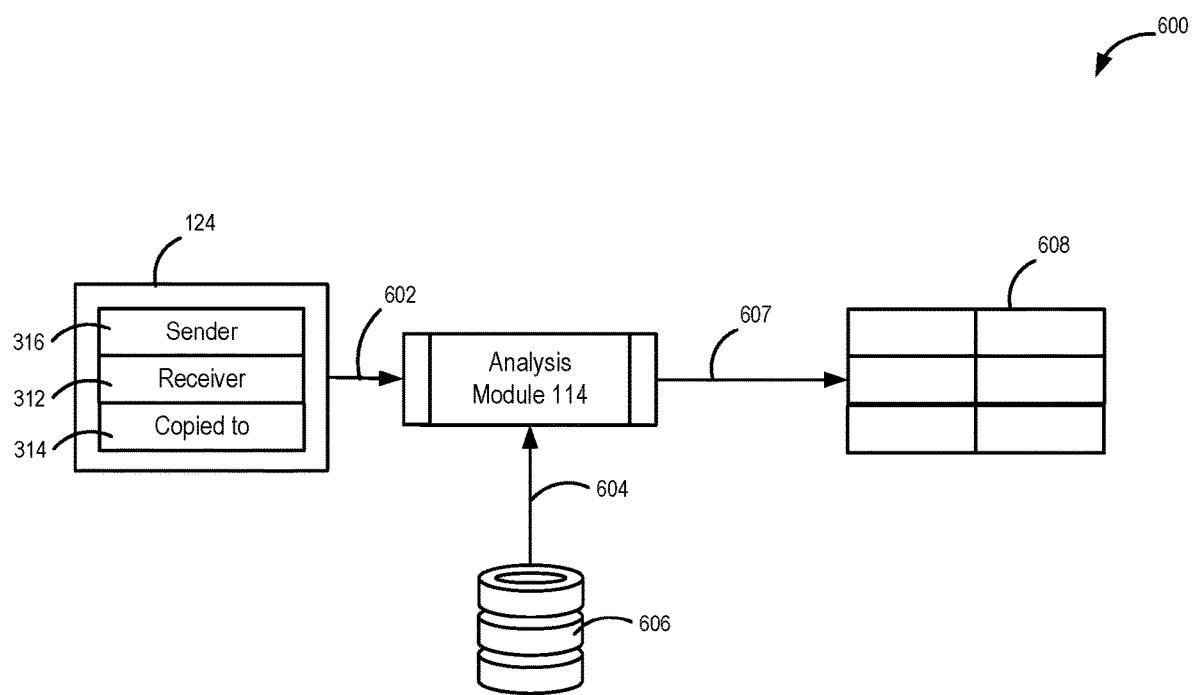
FIG. 6 illustrates an analysis process in a system for classifying electronic messages, in accordance with various embodiments.

With additional reference to FIG. 6, an analysis process 600 in system 100 for classifying electronic messages is illustrated. Analysis module 114 may receive the message metadata 124 extracted by process 300 and stored in database 116 (step 602). The metadata 124 may include sender 310, receiver 312, and CC field 314 and analysis module 114 may compare the elements (310, 312, 314) of metadata with the configuration data 122 and/or user data 120 (step 604). In various embodiments, the configuration data 122 and/or user data 120 may include an association table 606 between the metadata elements (310, 312, 314) and the case type data 118. In various embodiments, the analysis module 114 may populate a possible case type set 608 comprising a plurality of case types based on the association table and the received metadata elements (310, 312, 314) (step 607). In this regard, the system may generate a possible case type set based on the metadata. In various embodiments, each case type may be associated with a set of helper tags. The helper tags comprise a natural language text string which may be descriptive of the case type. In various embodiments, the case type may be a text string. For example, a first case type may be "Account Changes" and associated with helper tags, such as "update my account," "change account," "account changes," "revise account information," and/or the like. The helper tags may be stored as configuration data 122 in database 116.

Figure 7:
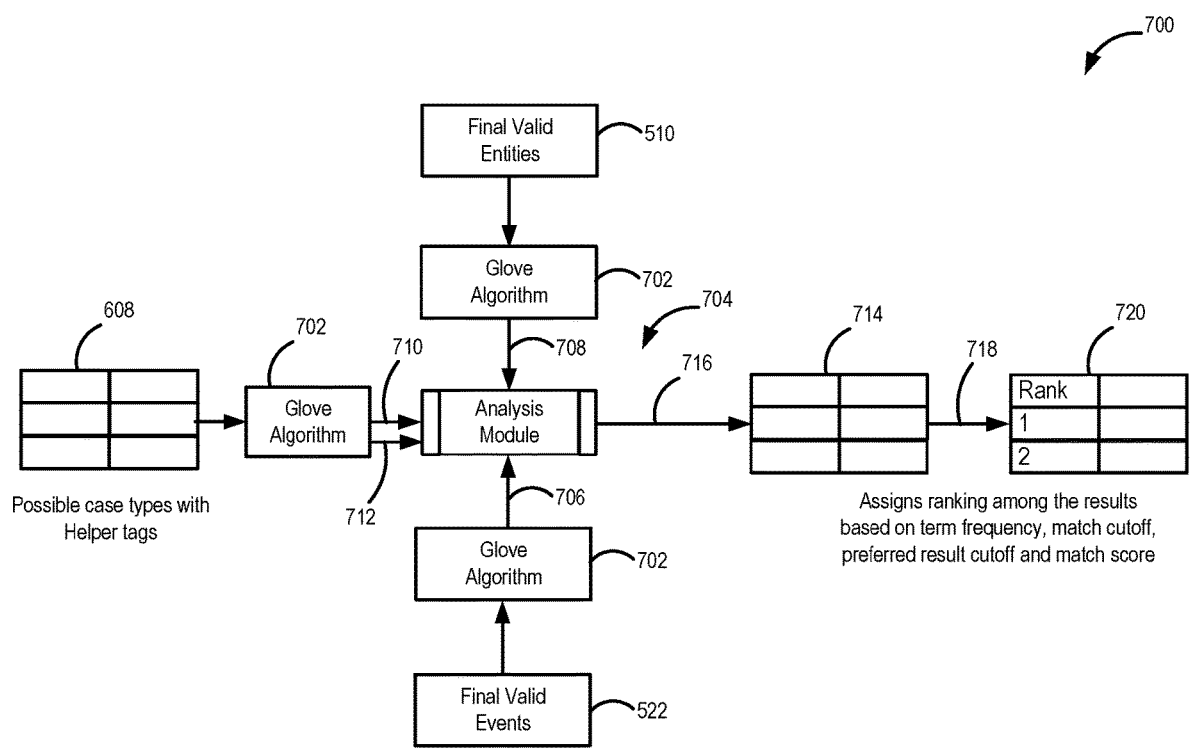
FIG. 7 illustrates an analysis process in a system for classifying electronic messages, in accordance with various embodiments.

With additional reference to FIG. 7, an analysis process 700 in system 100 for classifying electronic messages is illustrated. The analysis module 114 may apply a word vector algorithm such as, for example, glove algorithm 702 (GloVe, coined from Global Vectors, is a model for distributed word representation. The model is an unsupervised learning algorithm for obtaining vector representations for words. This is achieved by mapping words into a meaningful space where the distance between words is related to semantic similarity) to any of the possible case type set 608, the set of valid events 522, and/or the named entities 510 to generate respective word vectors (step 704). Step 704 includes generating an events word vector 706, an entities word vector 708, a case types word vector 710, and a helper tags word vector 712. The analysis module 114 may apply a document matching algorithm to the word vectors (706, 708, 710, 712) to generate a match set 714 between the word vectors (step 716). Step 716 may include combining the events word vector 706, the entities word vector 708, and the case types word vector 710 into a combined word vector and matching between the combined word vector and the helper tags word vector 712. The analysis module may apply a ranking algorithm to the match set 714 to generate a ranked match set 720 (step 718). Step 718 may include calculating a Term Frequency-Inverse Document Frequency (TFIDF) score for each element of the match set 714, calculating a proximity score for each element of the match set 717, or calculating an accuracy score for each element of the match set 714. In various embodiments, the rank of each element may be determined based on a proximity score cutoff, an accuracy score cutoff, the TFIDF score, or a combination thereof. Step 718 may include calculating a classification score for each element of the ranked match set 720.

Figure 8:
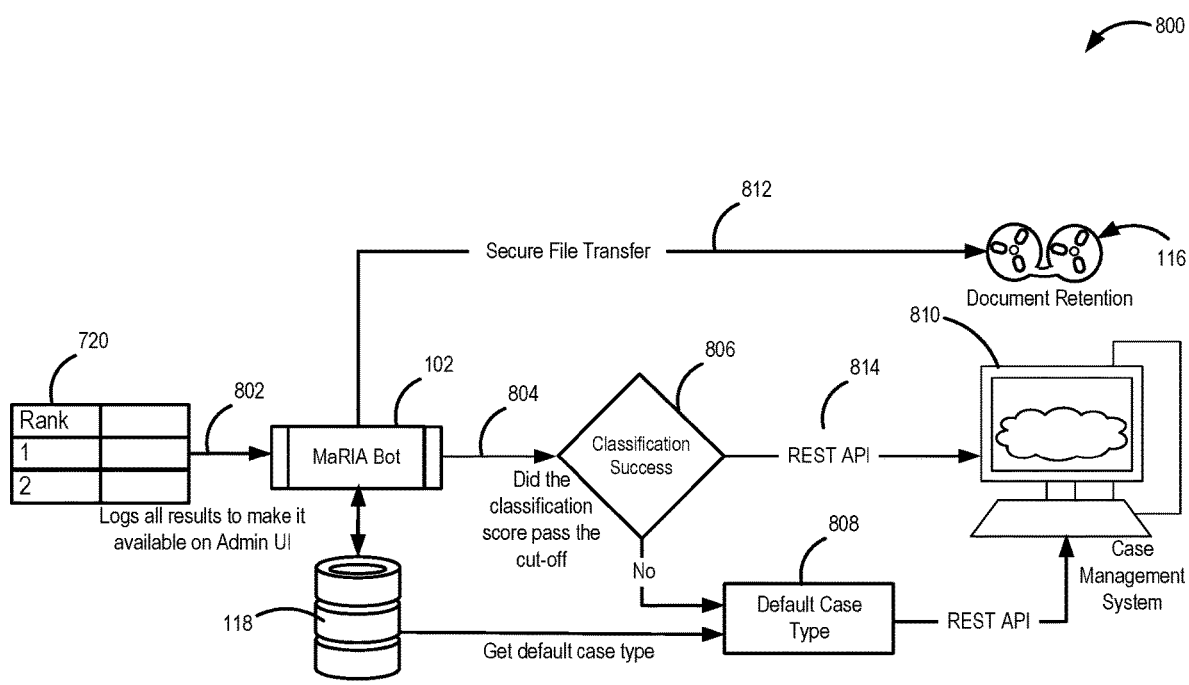
FIG. 8 illustrates a new case event generation process in a system for classifying electronic messages, in accordance with various embodiments.

With additional reference to FIG. 8, a new case event generation process 800 in system 100 for classifying electronic messages is illustrated. The system may select a highest ranked element of the ranked match set 720, and retrieve the associated case type from the case type data 118 of database 116 (step 802). The system may calculate a classification score for the highest ranked element and compare the classification score with a classification score cutoff (step 804). In various embodiments, the system may use any of the following parameters to identify the classification score—match score, number of matching vectors, and term frequency. For example, if the extracted event of interest from the message is "user id is locked out", then this is compared with the list of helper tags available. If a helper tag states "user id or password issues", the word vectors tend to signify that the two phrases are relatively close to each other. Further, since both of these phrases comprise "user id," the term frequency tends to be significant between the event of interest from the message and the helper tag. Hence, in this example, the system may tend to assign a high score for the match between these two phrases. The system may generate a new case event and assign a case type to the new case event based on the classification score (step 806). Where the classification score is less than the classification score cutoff, the system may retrieve a default case type from the case type data 118 and the case generation engine 110 may generate a new case event having the default case type in a case management system 810 (step 808). In response to generating the new case event, the system associates the electronic message and attachments 326 with the new case event in database 116 (step 812). Step 812 may include logging the classification score results and the ranked match set in database 116. Where the classification score is greater than the classification score cutoff, the system may retrieve the associated case type for the highest ranked element of the ranked match set 720, and the case generation engine 110 may generate the new case event in case management system 810 having the associated case type (step 814). In this regard, the system may generate the new case event in the case management system based on the case type determined by the analysis module 114.

Figure 9:
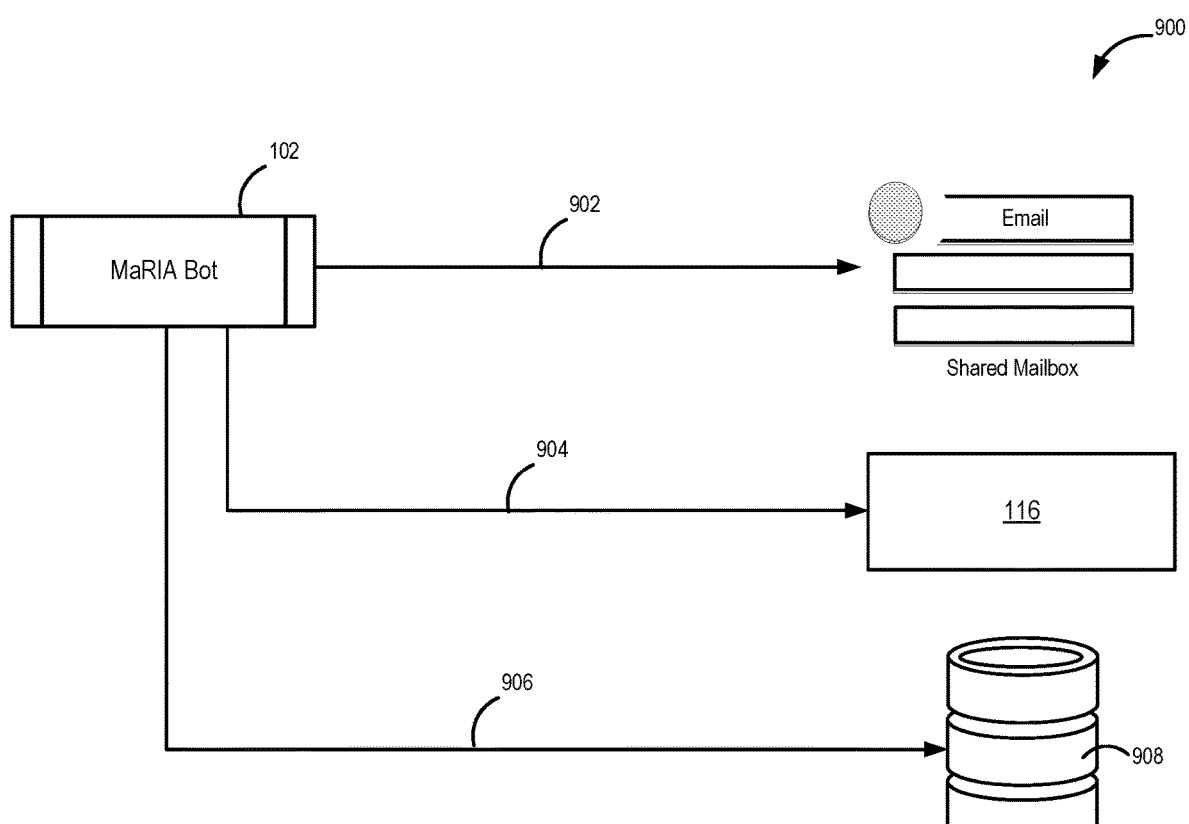
FIG. 9 illustrates a clean-up process in a system for classifying electronic messages, in accordance with various embodiments.

With additional reference to FIG. 9, a clean-up process 900 in system 100 for classifying electronic messages is illustrated. In response to generating the new case event, the system may execute the clean-up process 900. The system may move the electronic message from a first folder of the shared mailbox to a second folder of the shared mailbox (step 902). For example, the system may move the electronic message from an "unprocessed" folder to a "processed" folder. The system may command the database 116 to clean up temporary files (step 904). In various embodiments, the system may be configured for data logging and may record data logs 908 such as, for example, results of each of the various processes as to the database 116 (step 906).

Figure 10:
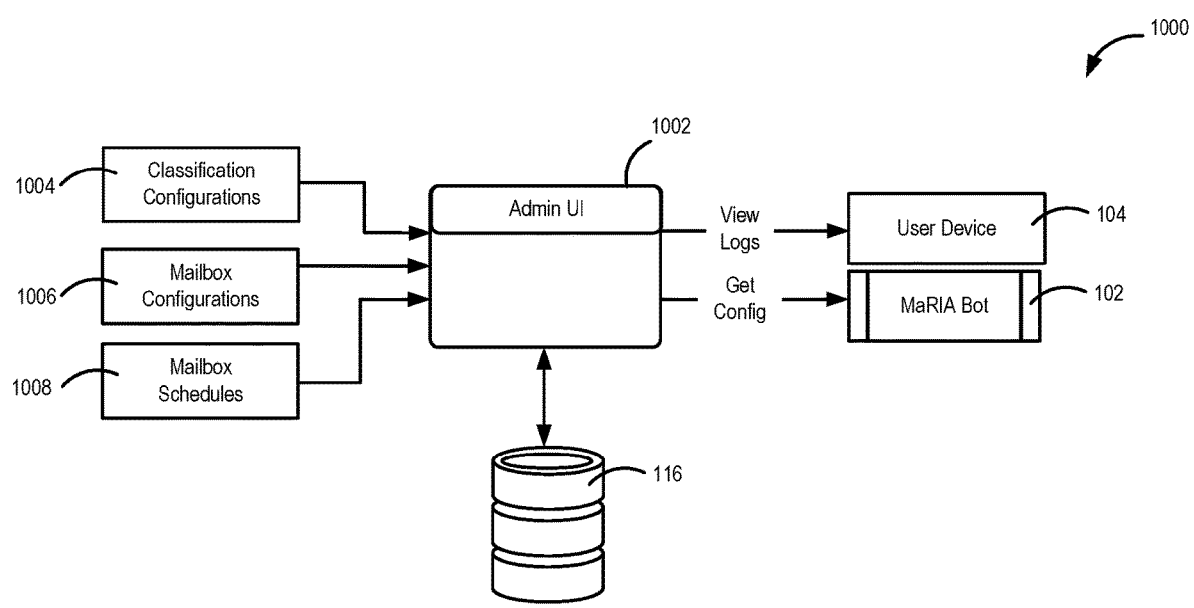
FIG. 10 illustrates a user interface module in a system for a classifying electronic messages, in accordance with various embodiments.

In various embodiments, and with additional reference to FIG. 10, system 100 may include a User Interface (UI) module 1000. The UI module 1000 includes an administrative interface 1002 which may be accessed via user device 104. Administrative interface 1002 may enable access to and modification of data elements of database 116 such as the configuration data 122 and the user data 120. Administrative interface 1002 may pass information such as data logs 908 to the user device 104. System users may tailor the processes of system 100 through administrative interface 1002 by entering classification configurations 1004, mailbox configurations 1006, and mailbox schedules 1008, which may be stored in database 116. Classification configurations 1004 may include, for example, changing helper tags, setting associated case types, changing the classification score cutoff, and/or the like. Mailbox configurations 1006 may include, for example, setting the first folder or the second folder, setting the shared mailbox, setting or modifying the association table 606 between the metadata elements (310, 312, 314) and the case type data 118, and/or the like. The mailbox schedules 1008 may include, for example, setting a conditional variable to run any of the processes or steps of system 100, such as a time based condition or a date based condition. For example, the mailbox schedules 1008 may include commanding the system to begin step 206 between the hours of 8:00 a.m. and 5:00 p.m. from Monday through Friday of each week.

The detailed description of various embodiments herein makes reference to the accompanying drawings and pictures, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not for purposes of limitation. For example, the steps recited in any of the method or process descriptions may be executed in any order and are not limited to the order presented. Moreover, any of the functions or steps may be outsourced to or performed by one or more third parties. Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set. Furthermore, any reference to singular includes plural embodiments, and any reference to more than one component may include a singular embodiment. Although specific advantages have been enumerated herein, various embodiments may include some, none, or all of the enumerated advantages.

Systems, methods, and computer program products are provided. In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

As used herein, "satisfy," "meet," "match," "associated with", or similar phrases may include an identical match, a partial match, meeting certain criteria, matching a subset of data, a correlation, satisfying certain criteria, a correspondence, an association, an algorithmic relationship, and/or the like. Similarly, as used herein, "authenticate" or similar terms may include an exact authentication, a partial authentication, authenticating a subset of data, a correspondence, satisfying certain criteria, an association, an algorithmic relationship, and/or the like, Terms and phrases similar to "associate" and/or "associating" may include tagging, flagging, correlating, using a look-up table or any other method or system for indicating or creating a relationship between elements, such as, for example, (i) a transaction account and (ii) an item (e.g., offer, reward, discount) and/or digital channel. Moreover, the associating may occur at any point, in response to any suitable action, event, or period of time. The associating may occur at pre-determined intervals, periodically, randomly, once, more than once, or in response to a suitable request or action. Any of the information may be distributed and/or accessed via a software enabled link, wherein the link may be sent via an email, text, post, social network input, and/or any other method known in the art.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In re Nuijten to fall outside the scope of patentable subject matter under 35 U.S.C. § 101.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described various embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element is intended to invoke 35 U.S.C. § 112(f) unless the element is expressly recited using the phrase "means for" or "step for". As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

In various embodiments, software may be stored in a computer program product and loaded into a computer system using a removable storage drive, hard disk drive, or communications interface. The control logic (software), when executed by the processor, causes the processor to perform the functions of various embodiments as described herein. In various embodiments, hardware components may take the form of application specific integrated circuits (ASICs). Implementation of the hardware so as to perform the functions described herein will be apparent to persons skilled in the relevant art(s).

As will be appreciated by one of ordinary skill in the art, the system may be embodied as a customization of an existing system, an add-on product, a processing apparatus executing upgraded software, a stand-alone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software, and hardware. Furthermore, the system may take the form of a computer program product on a computer-readable storage medium having computer-readable program code means embodied in the storage medium. Any suitable computer-readable storage medium may be utilized, including hard disks, CD-ROM, BLU-RAY DISC®, optical storage devices, magnetic storage devices, and/or the like.

The system and method may be described herein in terms of functional block components, screen shots, optional selections, and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C #, JAVA®, JAVASCRIPT®, JAVASCRIPT® Object Notation (JSON), VBScript, Macromedia COLD FUSION, COBOL, MICROSOFT® company's Active Server Pages, assembly, PERL®, PHP, awk, PYTHON®, Visual Basic, SQL Stored Procedures, PL/SQL, any UNIX® shell script, and extensible markup language (XML) with the various algorithms being implemented with any combination of data structures, objects, processes, routines or other programming elements.

Further, it should be noted that the system may employ any number of conventional techniques for data transmission, signaling, data processing, network control, and the like. Still further, the system could be used to detect or prevent security issues with a client-side scripting language, such as JAVASCRIPT®, VBScript, or the like.

The system and method are described herein with reference to screen shots, block diagrams and flowchart illustrations of methods, apparatus, and computer program products according to various embodiments. It will be understood that each functional block of the block diagrams and the flowchart illustrations, and combinations of functional blocks in the block diagrams and flowchart illustrations, respectively, can be implemented by computer program instructions.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user WINDOWS® applications, webpages, websites, web forms, prompts, etc. Practitioners will appreciate that the illustrated steps described herein may comprise in any number of configurations, including the use of WINDOWS® applications, webpages, web forms, popup WINDOWS® applications, prompts, and the like. It should be further appreciated that the multiple steps as illustrated and described may be combined into single webpages and/or WINDOWS® applications but have been expanded for the sake of simplicity. In other cases, steps illustrated and described as single process steps may be separated into multiple webpages and/or WINDOWS® applications but have been combined for simplicity.

In various embodiments, the software elements of the system may also be implemented using a JAVASCRIPT® run-time environment configured to execute JAVASCRIPT® code outside of a web browser. For example, the software elements of the system may also be implemented using NODE.JS® components. NODE.JS® programs may implement several modules to handle various core functionalities. For example, a package management module, such as NPM®, may be implemented as an open source library to aid in organizing the installation and management of third-party NODE.JS® programs. NODE.JS® programs may also implement a process manager, such as, for example, Parallel Multithreaded Machine ("PM2"); a resource and performance monitoring tool, such as, for example, Node Application Metrics ("appmetrics"); a library module for building user interfaces, and/or any other suitable and/or desired module.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the internet server. Middleware may be configured to process transactions between the various components of an application server and any number of internal or external systems for any of the purposes disclosed herein. WEBSPHERE® MQ™ (formerly MQSeries) by IBM®, Inc. (Armonk, N.Y.) is an example of a commercially available middleware product. An Enterprise Service Bus ("ESB") application is another example of middleware.

The computers discussed herein may provide a suitable website or other internet-based graphical user interface which is accessible by users. In one embodiment, MICROSOFT® company's Internet Information Services (IIS), Transaction Server (MTS) service, and an SQL SERVER® database, are used in conjunction with MICROSOFT® operating systems, WINDOWS NT® web server software, SQL SERVER® database, and MICROSOFT® Commerce Server. Additionally, components such as ACCESS® software, SQL SERVER® database, ORACLE® software, SYBASE® software, INFORMIX® software, MYSQL® software, INTERBASE® software, etc., may be used to provide an Active Data Object (ADO) compliant database management system. In one embodiment, the APACHE® web server is used in conjunction with a LINUX® operating system, a MYSQL® database, and PERL®, PHP, Ruby, and/or PYTHON® programming languages.

For the sake of brevity, conventional data networking, application development, and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., WINDOWS®, UNIX®, LINUX®, SOLARIS®, MACOS®, etc.) as well as various conventional support software and drivers typically associated with computers.

The present system or any part(s) or function(s) thereof may be implemented using hardware, software, or a combination thereof and may be implemented in one or more computer systems or other processing systems. However, the manipulations performed by embodiments may be referred to in terms, such as matching or selecting, which are commonly associated with mental operations performed by a human operator. No such capability of a human operator is necessary, or desirable, in most cases, in any of the operations described herein. Rather, the operations may be machine operations or any of the operations may be conducted or enhanced by artificial intelligence (AI) or machine learning. AI may refer generally to the study of agents (e.g., machines, computer-based systems, etc.) that perceive the world around them, form plans, and make decisions to achieve their goals. Foundations of AI include mathematics, logic, philosophy, probability, linguistics, neuroscience, and decision theory. Many fields fall under the umbrella of AI, such as computer vision, robotics, machine learning, and natural language processing. Useful machines for performing the various embodiments include general purpose digital computers or similar devices.

In various embodiments, the embodiments are directed toward one or more computer systems capable of carrying out the functionalities described herein. The computer system includes one or more processors. The processor is connected to a communication infrastructure (e.g., a communications bus, cross-over bar, network, etc.). Various software embodiments are described in terms of this exemplary computer system. After reading this description, it will become apparent to a person skilled in the relevant art(s) how to implement various embodiments using other computer systems and/or architectures. The computer system can include a display interface that forwards graphics, text, and other data from the communication infrastructure (or from a frame buffer not shown) for display on a display unit.

The computer system also includes a main memory, such as random access memory (RAM), and may also include a secondary memory. The secondary memory may include, for example, a hard disk drive, a solid-state drive, and/or a removable storage drive. The removable storage drive reads from and/or writes to a removable storage unit in a well-known manner. As will be appreciated, the removable storage unit includes a computer usable storage medium having stored therein computer software and/or data.

In various embodiments, secondary memory may include other similar devices for allowing computer programs or other instructions to be loaded into a computer system. Such devices may include, for example, a removable storage unit and an interface. Examples of such may include a program cartridge and cartridge interface (such as that found in video game devices), a removable memory chip (such as an erasable programmable read only memory (EPROM), programmable read only memory (PROM)) and associated socket, or other removable storage units and interfaces, which allow software and data to be transferred from the removable storage unit to a computer system.

The computer system may also include a communications interface. A communications interface allows software and data to be transferred between the computer system and external devices. Examples of such a communications interface may include a modem, a network interface (such as an Ethernet card), a communications port, etc. Software and data transferred via the communications interface are in the form of signals which may be electronic, electromagnetic, optical, or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

In various embodiments, the server may include application servers (e.g., WEBSPHERE®, WEBLOGIC®, JBOSS®, POSTGRES PLUS ADVANCED SERVER®, etc.). In various embodiments, the server may include web servers (e.g., Apache, IIS, GOOGLE® Web Server, SUN JAVA® System Web Server, JAVA® Virtual Machine running on LINUX® or WINDOWS® operating systems).

A web client includes any device or software which communicates via any network, such as, for example any device or software discussed herein. The web client may include internet browsing software installed within a computing unit or system to conduct online transactions and/or communications. These computing units or systems may take the form of a computer or set of computers, although other types of computing units or systems may be used, including personal computers, laptops, notebooks, tablets, smart phones, cellular phones, personal digital assistants, servers, pooled servers, mainframe computers, distributed computing clusters, kiosks, terminals, point of sale (POS) devices or terminals, televisions, or any other device capable of receiving data over a network. The web client may include an operating system (e.g., WINDOWS®, WINDOWS MOBILE® operating systems, UNIX® operating system, LINUX® operating systems, APPLE® OS® operating systems, etc.) as well as various conventional support software and drivers typically associated with computers. The web-client may also run MICROSOFT® INTERNET EXPLORER® software, MOZILLA® FIREFOX® software, GOOGLE® CHROME® software, APPLE® SAFARI' software, or any other of the myriad software packages available for browsing the internet.

As those skilled in the art will appreciate, the web client may or may not be in direct contact with the server (e.g., application server, web server, etc., as discussed herein). For example, the web client may access the services of the server through another server and/or hardware component, which may have a direct or indirect connection to an internet server. For example, the web client may communicate with the server via a load balancer. In various embodiments, web client access is through a network or the internet through a commercially-available web-browser software package. In that regard, the web client may be in a home or business environment with access to the network or the internet. The web client may implement security protocols such as Secure Sockets Layer (SSL) and Transport Layer Security (TLS). A web client may implement several application layer protocols including HTTP, HTTPS, FTP, and SFTP.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, JAVA® applets, JAVASCRIPT® programs, active server pages (ASP), common gateway interface scripts (CGI), extensible markup language (XML), dynamic HTML, cascading style sheets (CSS), AJAX (Asynchronous JAVASCRIPT And XML) programs, helper applications, plug-ins, and the like. A server may include a web service that receives a request from a web server, the request including a URL and an IP address (192.168.1.1). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. For example, representational state transfer (REST), or RESTful, web services may provide one way of enabling interoperability between applications.

The computing unit of the web client may be further equipped with an internet browser connected to the internet or an intranet using standard dial-up, cable, DSL, or any other internet protocol known in the art. Transactions originating at a web client may pass through a firewall in order to prevent unauthorized access from users of other networks. Further, additional firewalls may be deployed between the varying components of CMS to further enhance security.

Encryption may be performed by way of any of the techniques now available in the art or which may become available—e.g., Twofish, RSA, El Gamal, Schorr signature, DSA, PGP, PM, GPG (GnuPG), HPE Format-Preserving Encryption (FPE), Voltage, Triple DES, Blowfish, AES, MD5, HMAC, IDEA, RC6, and symmetric and asymmetric cryptosystems. The systems and methods may also incorporate SHA series cryptographic methods, elliptic curve cryptography (e.g., ECC, ECDH, ECDSA, etc.), and/or other post-quantum cryptography algorithms under development.

Any databases discussed herein may include relational, hierarchical, graphical, blockchain, object-oriented structure, and/or any other database configurations. Any database may also include a flat file structure wherein data may be stored in a single file in the form of rows and columns, with no structure for indexing and no structural relationships between records. For example, a flat file structure may include a delimited text file, a CSV (comma-separated values) file, and/or any other suitable flat file structure. Common database products that may be used to implement the databases include DB2® by IBM® (Armonk, N.Y.), various database products available from ORACLE® Corporation (Redwood Shores, Calif.), MICROSOFT ACCESS® or MICROSOFT SQL SERVER® by MICROSOFT® Corporation (Redmond, Wash.), MYSQL® by MySQL AB (Uppsala, Sweden), MONGODB®, Redis, APACHE CASSANDRA®, HBASE® by APACHE®, MapR-DB by the MAPR® corporation, or any other suitable database product. Moreover, any database may be organized in any suitable manner, for example, as data tables or lookup tables. Each record may be a single file, a series of files, a linked series of data fields, or any other data structure.

Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one embodiment, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); data stored as Binary Large Object (BLOB); data stored as ungrouped data elements encoded using ISO/IEC 7816-6 data elements; data stored as ungrouped data elements encoded using ISO/IEC Abstract Syntax Notation (ASN.1) as in ISO/IEC 8824 and 8825; other proprietary techniques that may include fractal compression methods, image compression methods, etc.

In various embodiments, the ability to store a wide variety of information in different formats is facilitated by storing the information as a BLOB. Thus, any binary information can be stored in a storage space associated with a data set. As discussed above, the binary information may be stored in association with the system or external to but affiliated with the system. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data, in the database or associated with the system, by multiple and unrelated owners of the data sets. For example, a first data set, which may be stored, may be provided by a first party, a second data set, which may be stored, may be provided by an unrelated second party, and yet a third data set, which may be stored, may be provided by a third party unrelated to the first and the second party. Each of these three exemplary data sets may contain different information that is stored using different data storage formats and/or techniques. Further, each data set may contain subsets of data that also may be distinct from other subsets.

As stated above, in various embodiments, the data can be stored without regard to a common format. However, the data set (e.g., BLOB) may be annotated in a standard manner when provided for manipulating the data in the database or system. The annotation may comprise a short header, trailer, or other appropriate indicator related to each data set that is configured to convey information useful in managing the various data sets. For example, the annotation may be called a "condition header," "header," "trailer," or "status," herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user, or the like. Furthermore, the security information may restrict/permit only certain actions, such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer, may be received by a standalone interaction device configured to add, delete, modify, or augment the data in accordance with the header or trailer. As such, in one embodiment, the header or trailer is not stored on the transaction device along with the associated issuer-owned data, but instead the appropriate action may be taken by providing to the user, at the standalone device, the appropriate option for the action to be taken. The system may contemplate a data storage arrangement wherein the header or trailer, or header or trailer history, of the data is stored on the system, device or transaction instrument in relation to the appropriate data.

One skilled in the art will also appreciate that, for security reasons, any databases, systems, devices, servers, or other components of the system may consist of any combination thereof at a single location or at multiple locations, wherein each database or system includes any of various suitable security features, such as firewalls, access codes, encryption, decryption, compression, decompression, and/or the like.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The data may be big data that is processed by a distributed computing cluster. Distributed computing cluster may be, for example, a HADOOP® software cluster configured to process and store big data sets with some of nodes comprising a distributed storage system and some of nodes comprising a distributed processing system. In that regard, distributed computing cluster may be configured to support a HADOOP® software distributed file system (HDFS) as specified by the Apache Software Foundation at www.hadoop.apache.org/docs.

As used herein, the term "network" includes any cloud, cloud computing system, or electronic communications system or method which incorporates hardware and/or software components. Communication among the parties may be accomplished through any suitable communication channels, such as, for example, a telephone network, an extranet, an intranet, internet, point of interaction device (point of sale device, personal digital assistant (e.g., an IPHONE® device, a BLACKBERRY® device), cellular phone, kiosk, etc.), online communications, satellite communications, off-line communications, wireless communications, transponder communications, local area network (LAN), wide area network (WAN), virtual private network (VPN), networked or linked devices, keyboard, mouse, and/or any suitable communication or data input modality. Moreover, although the system is frequently described herein as being implemented with TCP/IP communications protocols, the system may also be implemented using IPX, APPLETALK® program, IP-6, NetBIOS, OSI, any tunneling protocol (e.g. IPsec, SSH, etc.), or any number of existing or future protocols. If the network is in the nature of a public network, such as the internet, it may be advantageous to presume the network to be insecure and open to eavesdroppers. Specific information related to the protocols, standards, and application software utilized in connection with the internet is generally known to those skilled in the art and, as such, need not be detailed herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand.

As used herein, "transmit" may include sending electronic data from one system component to another over a network connection. Additionally, as used herein, "data" may include encompassing information such as commands, queries, files, data for storage, and the like in digital or any other form.

The disclosure and claims do not describe only a particular outcome of automated classifying of electronic messages, but the disclosure and claims include specific rules for implementing the outcome of automated classifying of electronic messages and that render information into a specific format that is then used and applied to create the desired results of automated classifying of electronic messages and support case generation, as set forth in *McRO, Inc. v. Bandai Namco Games America Inc.* (Fed. Cir. case number 15-1080, Sep. 13, 2016). In other words, the outcome of automated classifying of electronic messages can be performed by many different types of rules and combinations of rules, and this disclosure includes various embodiments with specific rules. While the absence of complete preemption may not guarantee that a claim is eligible, the disclosure does not sufficiently preempt the field of automated classifying of electronic messages at all. The disclosure acts to narrow, confine, and otherwise tie down the disclosure so as not to cover the general abstract idea of just automated classifying of electronic messages. Significantly, other systems and methods exist for automated classifying of electronic messages, so it would be inappropriate to assert that the claimed invention preempts the field or monopolizes the basic tools of automated classifying of electronic messages. In other words, the disclosure will not prevent others from automated classifying of electronic messages, because other systems are already performing the functionality in different ways than the claimed invention. Moreover, the claimed invention includes an inventive concept that may be found in the non-conventional and non-generic arrangement of known, conventional pieces, in conformance with *Bascom v. AT&T Mobility,* 2015-1763 (Fed. Cir. 2016). The disclosure and claims go way beyond any conventionality of any one of the systems in that the interaction and synergy of the systems leads to additional functionality that is not provided by any one of the systems operating independently. The disclosure and claims may also include the interaction between multiple different systems, so the disclosure cannot be considered an implementation of a generic computer, or to just "apply it" to an abstract process. The disclosure and claims may also be directed to improvements to software with a specific implementation of a solution to a problem in the software arts.

What is claimed is:

1. A method, comprising:
receiving, by a computer based system, an electronic message comprising text including a message body and a metadata;
determining, by the computer based system, a case status based on the metadata;
extracting, by the computer based system, a set of events from the message body in response to the case status;
determining, by the computer based system, a case type based on the set of events and a set of case types;
generating, by the computer based system, a new case event based on the case type;
pulling, by the computer based system, the electronic message from a shared mailbox of an electronic mail system;
validating, by the computer based system, the metadata and the message body for readability;
determining, by the computer based system, an encrypted portion of electronic message;
calling, by the computer based system, a decryption service to generate a plain text of the electronic message from the encrypted portion;
passing, by the computer based system, the plain text to a stripping module;
stripping, by the computer based system, the metadata and the message body from the plain text;
extracting, by the computer based system and from the metadata, at least one of a sender, a receiver, a copied to, or a subject;
extracting, by the computer based system and from the message body, at least one of a greeting, a body meat, a signature, a disclaimer, or an attachment, wherein the extracting is based at least in part on an extraction pattern matching algorithm configured to identify sentence fragments of the electronic message based at least in part on content and relative position within the electronic message;
tokenizing, by the computer based system via a tokenizer subprocess, the body meat into a plurality of tokenized sentences;
applying, by the computer based system, a perceptron tagging algorithm to generate a tagged sentence set based on a custom defined electronic message corpus and a standard language corpus; and
determining, by the computer based system, a set of valid events based on the tagged sentence set and an applied set of grammar rules defining the set of events.

2. The method of claim 1, further comprising:
applying, by the computer based system, an abbreviated term expander to the tagged sentence set, removing an abbreviated text, and injecting an expanded text into the tagged sentence set;
generating, by the computer based system, a raw event set based on the tagged sentence set and the applied set of grammar rules; and
comparing, by the computer based system, the raw event set with a set of noise events.

3. The method of claim 2, further comprising:
generating, by the computer based system, a possible case type set based on the metadata,
wherein the possible case type set comprises a case type associated with a helper tag;
applying, by the computer based system, a glove algorithm to each of the possible case type set, the named entity, the set of valid events, and the helper tag to generate an entities word vector, an events word vector, a case types word vector, and a helper tags word vector;
matching, by the computer based system, the entities word vector, the events word vector, the case types word vector, and the helper tags word vector to generate a match set; and
ranking, by the computer based system, the match set to generate a ranked match set.

4. The method of claim 3, further comprising:
calculating, by the computer based system, a classification score for a highest ranked element of the ranked match set;
generating, by the computer based system, the new case event in a case management system having a default case type when the classification score is less than a classification score cutoff; and
generating, by the computer based system, the new case event in the case management system having a case type associated with the highest ranked element of the ranked match set when the classification score is greater than the classification score cutoff.

5. A system comprising:
a processor; and
a tangible, non-transitory memory configured to communicate with the processor,
the tangible, non-transitory memory having instructions stored thereon that, in response to execution by the processor, cause the processor to perform operations comprising:
receiving, by the processor, an electronic message comprising text including a message body and a metadata;
determining, by the processor, a case status based on the metadata;
extracting, by the processor, a set of events from the message body in response to the case status;
determining, by the processor, a case type based on the set of events and a set of case types;
generating, by the processor, a new case event based on the case type;
pulling, by the processor, the electronic message from a shared mailbox of an electronic mail system;
validating, by the processor, the metadata and the message body for readability;
determining, by the processor, an encrypted portion of electronic message;
calling, by the processor, a decryption service to generate a plain text of the electronic message from the encrypted portion; and
passing, by the computer based system, the plain text to a stripping module.
stripping, by the processor, the metadata and the message body from the plain text;
extracting, by the processor and from the metadata, at least one of a sender, a receiver, a copied to, or a subject;
extracting, by the processor and from the message body, at least one of a greeting, a body meat, a signature, a disclaimer, or an attachment, wherein the extracting is based on an extraction pattern matching algorithm configured to identify sentence fragments of the electronic message based at least in part on content and relative position within the electronic message;

tokenizing, by the processor, the body meat into a plurality of tokenized sentences;

applying, by the processor, a perceptron tagging algorithm to generate a tagged sentence set based on a custom defined electronic message corpus and a standard language corpus; and determining, by the processor, a set of valid events based on the tagged sentence set and an applied set of grammar rules defining the set of events.

6. The system of claim 5, further comprising:

applying, by the processor, an abbreviated term expander to the tagged sentence set, removing an abbreviated text, and injecting an expanded text into the tagged sentence set;

generating, by the processor, a raw event set based on the tagged sentence set and the applied set of grammar rules; and comparing, by the processor, the raw event set with a set of noise events.

7. The system of claim 6, further comprising:

generating, by the processor, a possible case type set based on the metadata, wherein the possible case type set comprises a case type associated with a helper tag;

applying, by the processor, a glove algorithm to each of the possible case type set, the named entity, the set of valid events, and the helper tag to generate an entities word vector, an events word vector, a case types word vector, and a helper tags word vector;

matching, by the processor, the entities word vector, the events word vector, the case types word vector, and the helper tags word vector to generate a match set; and ranking, by the processor, the match set to generate a ranked match set.

8. The system of claim 7, further comprising:

calculating, by the processor, a classification score for a highest ranked element of the ranked match set;

generating, by the processor, the new case event in a case management system having a default case type when the classification score is less than a classification score cutoff; and generating, by the processor, the new case event in the case management system having a case type associated with the highest ranked element of the ranked match set when the classification score is greater than the classification score cutoff.

9. An article of manufacture including a non-transitory, tangible computer readable storage medium having instructions stored thereon that, in response to execution by a computer based system, cause the computer based system to perform operations comprising:

receiving, by the computer based system, an electronic message comprising text including a message body and a metadata;

determining, by the computer based system, a case status based on the metadata;

extracting, by the computer based system, a set of events from the message body in response to the case status;

determining, by the computer based system, a case type based on the set of events and a set of case types; and generating, by the computer based system, a new case event based on the case type;

pulling, by the computer based system, the electronic message from a shared mailbox of an electronic mail system;

validating, by the computer based system, the metadata and the message body for readability;

determining, by the computer based system, an encrypted portion of the electronic message;

calling, by the computer based system, a decryption service to generate a plain text of the electronic message from the encrypted portion;

passing, by the computer based system, the plain text to a stripping module;

stripping, by the computer based system, the metadata and the message body from the plain text;

extracting, by the computer based system and from the metadata, at least one of a sender, a receiver, a copied to, or a subject;

extracting, by the computer based system and from the message body, at least one of a greeting, a body meat, a signature, a disclaimer, or an attachment, wherein the extracting is based at least in part on an extraction pattern matching algorithm configured to identify sentence fragments of the electronic message based at least in part on content and relative position within the electronic message;

tokenizing, by the computer based system via a tokenizer subprocess, the body meat into a plurality of tokenized sentences;

applying, by the computer based system, a perceptron tagging algorithm to generate a tagged sentence set based on a custom defined electronic message corpus and a standard language corpus; and determining, by the computer based system, a set of valid events based on the tagged sentence set and an applied grammar rules defining the set of events.

10. The article of manufacture of claim 9, further comprising:

applying, by the computer based system, an abbreviated term expander to the tagged sentence set, removing an abbreviated text, and injecting an expanded text into the tagged sentence set;

generating, by the computer based system, a raw event set based on the tagged sentence set and the applied set of grammar rules; and comparing, by the computer based system, the raw event set with a set of noise events.

11. The article of manufacture of claim 10, further comprising:

generating, by the computer based system, a possible case type set based on the metadata, wherein the possible case type set comprises a case type associated with a helper tag;

applying, by the computer based system, a glove algorithm to each of the possible case type set, the named entity, the set of valid events, and the helper tag to generate an entities word vector, an events word vector, a case types word vector, and a helper tags word vector;

matching, by the computer based system, the entities word vector, the events word vector, the case types word vector, and the helper tags word vector to generate a match set; and ranking, by the computer based system, the match set to generate a ranked match set.

12. The article of manufacture of claim 10, further comprising extracting, by the computer based system, a reference ID from the body meat.

13. The article of manufacture of claim 10, further comprising extracting, by the computer based system, a named entity from the body meat.

14. The article of manufacture of claim 10, further comprising discarding, by the computer based system, an event from the raw event set which positively compares with the noise event sent to generate the set of valid events.

15. The method of claim 2, further comprising extracting, by the computer based system, a reference ID from the body meat.

16. The method of claim 2, further comprising extracting, by the computer based system, a named entity from the body meat.

17. The method of claim 2, further comprising discarding, by the computer based system, an event from the raw event set which positively compares with the noise event sent to generate the set of valid events.

18. The system of claim 6, further comprising extracting, by the processor, a reference ID from the body meat.

19. The system of claim 6, further comprising extracting, by the processor, a named entity from the body meat.

20. The system of claim 6, further comprising discarding, by the processor, an event from the raw event set which positively compares with the noise event sent to generate the set of valid events.

\* \* \* \* \*